Nov. 18, 1941.  W. E. NORVELL  2,262,814
RECIPROCATING DRIVE
Filed May 18, 1939   2 Sheets-Sheet 1

INVENTOR
William E. Norvell
BY Alfred R. Fuchs
ATTORNEY

Nov. 18, 1941.   W. E. NORVELL   2,262,814
RECIPROCATING DRIVE
Filed May 18, 1939   2 Sheets-Sheet 2
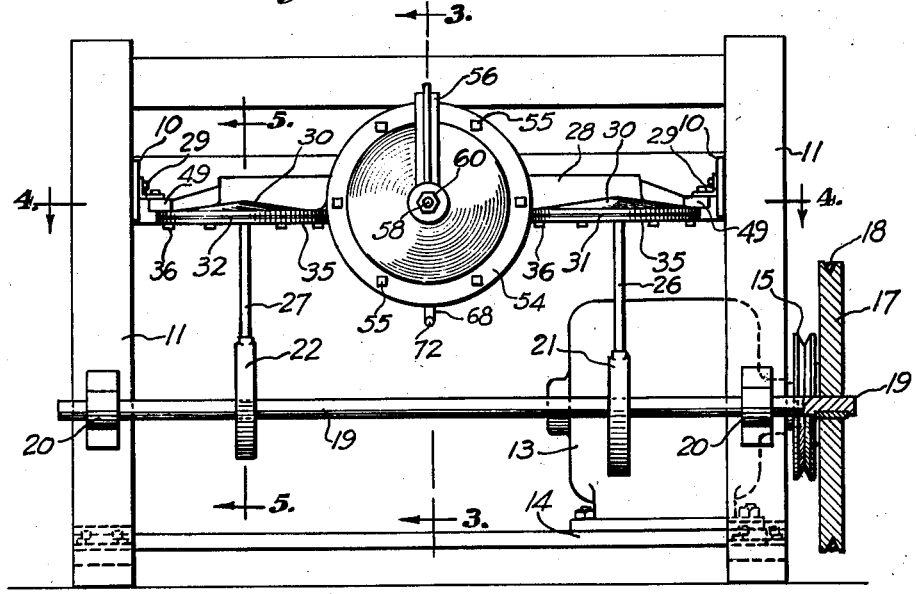
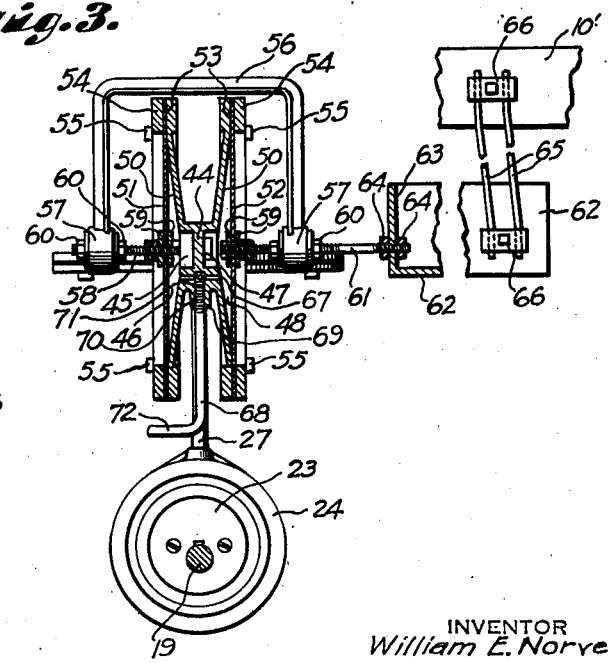
INVENTOR
William E. Norvell
BY Alfred R. Fuchs
ATTORNEY Patented Nov. 18, 1941

2,262,814

UNITED STATES PATENT OFFICE 2,262,814

RECIPROCATING DRIVE

William E. Norvell, Kansas City, Mo.

Application May 18, 1939, Serial No. 274,359

7 Claims. (Cl. 60—62.5)

My invention relates to a reciprocating drive, and more particularly to a drive of this character for producing short rapid reciprocations of a member such as are required for various apparatus having a shaking motion, such as sorters, bolters, sifters, or other devices, requiring such motion.

It is a common practice to reciprocate a member requiring such a rapid reciprocating motion by means of an eccentric mounted on a shaft and connected with the member that is to be rapidly reciprocated. Numerous objections exist in the use of an eccentric drive of this character, because of the nature of such a drive, one of the principal objections being to the fact that there is not only movement of the rod or other member, connected with the eccentric sleeve and with the member to be reciprocated, in a direction lengthwise of itself to produce the reciprocating motion, but there is a movement of at least one end of the rod-like member, or connecting member, between the eccentric sleeve and the member to be reciprocated, in a direction substantially perpendicular to the direction in which reciprocation is desired. This causes a whipping acton of the rod-like member connecting the eccentric sleeve with the member that is to be reciprocated. This whipping action becomes somewhat rhythmic, due to the fact that the rate of rotation is constant and causes undesirable vibrations in a direction perpendicular to the direction desired of the member that is to be reciprocated, as well as undesirable strains on the rod-like member that serves as a driving connection between the eccentric and the member to be reciprocated, this being particularly objectionable in any sorting, sifting, or screening mechansm.

The other principal objection, to reciprocating a member by means of an eccentric drive of the character above mentioned, is that the change in direction of movement takes place so suddenly that there is a tendency, due to the inertia of the parts, to continue movement in the same direction, causing what might be referred to as backlash, in the reciprocation of the member that is driven by the eccentric. This sudden change in direction of movement occurs at both ends of the stroke and, of course, also transversely of the connecting member, or driving member, midway between the ends of the stroke in both directions, during the whipping action above referred to.

It is the principal purpose of my invention to provide means for driving a member that must be rapidly reciprocated, in a manner such that all the whipping action and all of the shock, or backlash, caused by sudden reversal of movement at the opposite ends of the reciprocation, are eliminated. This is accomplished by providing a drive in which the rotative motion of a shaft is changed into a reciprocating motion by eccentric driving means, and this reciprocating motion is utilized to produce a cushioned, substantially straight line, reciprocating motion, by utilization of a compressible fluid acted on by the shaft driven means to actuate the straight line reciprocating drive. This is accomplished by providing means for creating changes in pressure in a pair of chambers, so that one chamber will have a decrease below atmospheric pressure therein take place at the same time that the other chamber has an increase above atmospheric pressure taking place therein, and utilizing flexible diaphragms responsive to the changes in pressure between that in the chambers and that in the atmosphere to drive a driving member that is connected directly with the apparatus that is to be reciprocated. The diaphragms referred to above, are, preferably, arranged in substantial parallelism with the driving means connected substantially centrally thereto, the connections with the diaphragms being in axial alignment with each other, so that the connection between the driving member and the diaphragms aids in holding the driving member in a position to reciprocate lengthwise of itself in substantially a straight line.

It is a further purpose of my invention to provide means for controlling the amplitude of the reciprocation produced by my improved means for producing a reciprocating motion, which comprises means for controlling the variations in pressure created in the chambers above referred to, comprising by-pass means and means for controlling the passage of compressible fluid through said by-pass means to control the pressure changes in the chambers above referred to, and also comprising means for varying the rate of rotation of the shaft carrying the eccentrics, whereby the lenth of stroke can also be controlled.

More specifically, my invention has for its purpose the provision of an apparatus comprising a pair of diaphragms that comprise walls of chambers that are sealed from the atmosphere and contain a compressible fluid, which are connected with eccentric means so mounted on a shaft that one diaphragm is moved in a direction to decrease the size of the chamber with which it is associated at the same time that the other diaphragm increases the size of the chamber with which it is associated, and a pair of chambers having diaphragms forming one of the walls of each thereof, to which the driving member above referred to, is connected, which chambers are each connected with one of the first mentioned chambers by a passage, which is smaller than the area of the diaphragm, the last mentioned chambers being also connected by means of a by-pass passage, which is smaller than the previously mentioned passage and the effective size of which is controlled by a valve, which can also completely cut the chambers connected by the by-pass off from each other. It will be obvious that the rate at which flexure of the mechanically actuated diaphragms takes place will affect the length of the stroke produced by the fluid pressure actuated diaphragms, due to the fact that there will, of course, be a certain amount of fluid friction through the passages connecting the various chambers, and that accordingly the more rapidly the shaft is rotated, the shorter the stroke will be. Also, due to the provision of the by-pass, the length of the stroke of the reciprocating motion, or amplitude thereof, can be varied within very fine limits for any one speed at which the shaft may rotate.

Other objects and advantages of my invention will appear as the description of the drawings proceeds. I desire to have it understood, however, that I do not intend to limit myself to the particular details shown or described, except as defined in the claims.

In the drawings:

Fig. 2 is a front elevational view, partly broken away, of my improved reciprocating driving means, on a somewhat enlarged scale.

Fig. 3 is a section, partly broken away, taken on the line 3—3 of Fig. 2, on an enlarged scale, but showing the diaphragms unflexed.

Fig. 7 is a fragmentary section taken on the line 5—5 of Fig. 7, but showing the diaphragm unflexed.

Figure 1:
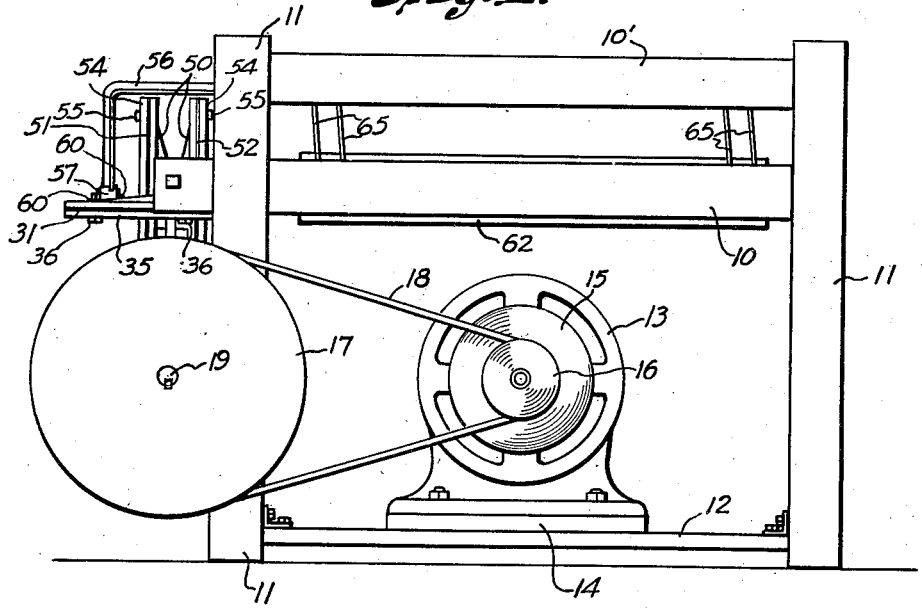
Fig. 1 is a view in side elevation of my improved reciprocating driving means, showing the same attached to a member to be reciprocated, such as a bolter sieve.

Referring in detail to the drawings, my improved reciprocating drive is shown as being mounted on a frame having longitudinal frame members 10, vertical frame members 11, and longitudinal frame members 12. A motor 13 is mounted on a transverse frame member 14, or in any other suitable manner, and is provided with a pair of pulleys 15 and 16 for driving the drive wheel 17 at a plurality of speeds through a belt, or similar driving member, 18, said driving pulley 17 being mounted on a shaft 19 to rotate therewith, said shaft being mounted in suitable bearings 20, provided on the vertical frame members 11.

The shaft 19 has a pair of eccentrics 21 and 22 mounted thereon, said eccentrics being mounted so as to be spaced 180 degrees apart on the shaft 19, that is, the peripheral portion of the eccentric 21, that is the nearest the shaft 19, is diametrically opposite the peripheral portion of the eccentric 22 that is nearest the shaft 19. The eccentrics may be constructed in any desired manner, and as will be evident from Figs. 3 and 5. Said eccentrics each have an eccentric portion 23 that is fixed to the shaft to rotate therewith, and a sleeve 24, which is spaced from the eccentric portion 23, the portion 23 being freely rotatable within the sleeve portion 24, due to the provision of ball bearings 25 between the sleeve portion and the portion 23 keyed to the shaft.

The sleeve portion 24 of the eccentric 21 has a rod-like member 26 secured thereto in any suitable manner, and the sleeve portion 24 of the eccentric 22 has a similar rod-like member 27 secured thereto in the same way. Said rod-like members 26 and 27 are fixed to the sleeve members 24, so as to move therewith as said sleeve members 24 are moved up and down, due to the eccentric members 23 within the sleeves 24. Obviously the eccentric member 23 will cause some sideward movement of the eccentric sleeve 24 within which the same is mounted, as well as vertical movement thereof. In fact the end of the member 26 or 27, as the case may be, that is secured to the sleeve 24, will have as much horizontal as vertical movement. However, this will not be true of the upper ends of the rod-like members 26 and 27, as will be obvious as the description proceeds.

My improved drive comprises a body portion 28, which is secured to the frame members 10 by means of angle brackets 29. Said body portion is provided with a pair of chambers having the wall portions 30 formed integral with the body portion 28, and the flexible wall portions 31 and 32 providing chambers 33 between the wall portions 30 and the flexible wall portions 31 and 32, respectively. The wall portions 31 and 32 are diaphragms that are secured to the annular seats 34 provided therefor, by means of the clamping rings 35, which are secured in position by any suitable means, such as the headed fastening elements 36. The ends of the rod-like members 26 and 27 that are remote from the eccentric sleeves 24 are secured in fluid tight relation with the diaphragms 31 and 32, by means of a pair of clamping washers 37, provided on opposite sides of the diaphragm members and the nuts 38 and 39, which engage the threads provided on the upper ends of the rod-like members 26 and 27, respectively.

The body portion 28 is recessed at 40 and 41 to accommodate the nuts 39 and the washers 37, so that the diaphragms 31 and 32 can closely approach the inner faces of the conical wall portions 30 of the chambers 33. It will be obvious that when the rod 27 is projected upwardly to its limit by the eccentric 22, it will flex the center portion of the diaphragm 32 inwardly toward the wall 30 to provide the minimum capacity for the chamber 33. Preferably, the diaphragm 32 in that position, will substantially engage the wall 30. At that time the diaphragm 31 will be flexed downwardly at its center the same amount that the diaphragm 32 will be flexed upwardly at its center, and the chamber 33 associated therewith will have its maximum capacity. In Fig. 2 the eccentrics 21 and 22 are shown in such position that the diaphragm 32 will be flexed upwardly at its center, and the diaphragm 31 will be flexed downwardly at its center. Such upward flexing of the diaphragm is clearly shown in Fig. 5.

Figure 4:
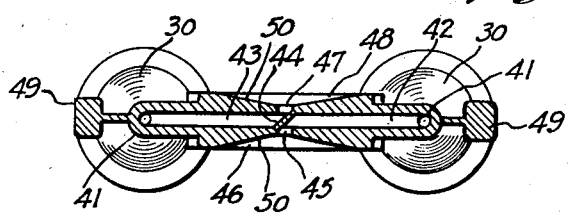
Fig. 4 is a section taken on the line 4—4 of Fig. 2, on a somewhat reduced scale.

The body portion 28 is provided with a passage 42, that extends from the chamber 33 of which the diaphragm 31 forms a wall, and with a passage 43, that extends from the chamber 33 of which the diaphragm 32 forms a wall, said passages being separated by a web portion 44, as will be evident from Fig. 4. The passage 42 opens at 45 into a recess 46 in the body portion 28, the passage 43 opens at 47 into a recess 48 in the body portion 28, said recesses 46 and 48 providing chambers within the body portion 44 connected, respectively, with the chambers back of the diaphragms 31 and 32. The body portion is also provided with thickened portions 49 at opposite ends thereof, to which the angle brackets 29 are connected. The walls 50 of the recesses 46 and 48 are substantially conical, as will be evident from Figs. 3 and 4, and the portions 45 and 47 of the passages 42 and 43 form recesses that accommodate certain of the movable parts carried by the diaphragms 51 and 52 cooperating with the wall 50 of each of the recesses 46 and 48 to provide a second pair of chambers within the body portion 28.

The conical wall portions 50, providing the recesses 46 and 48, are provided with peripheral thickened portions surrounding the same forming annular seats 53 for the diaphragms 51 and 52, said diaphragms being clamped to said seats by means of the clamping rings 54, and suitable fastening elements, such as the headed securing elements 55, to thus provide chambers that are sealed from the atmosphere. A driving member comprising a U-shaped, or yoke-like, member 56, which is substantially T-shaped in cross section and which terminates in a pair of enlargements 57, is provided, to be operated by the flexing of the diaphragms 51 and 52 in opposite directions. A screw-threaded rod-like member 58 is secured to the diaphragm 51 in fluid tight relation thereto, by means of the clamping washers 59 and a pair of nuts engaging the threaded rod-like member 58 to clamp said washers 59 to the diaphragm 51. The screw-threaded rod-like member 58 extends through an opening in the enlargement 57 and is secured in fixed position to the yoke-like member 56, by means of the clamping nuts 60 and suitable washers mounted between said nuts and the enlargement 57.

A screw-threaded rod-like member 61 is secured to the other enlargement 57 on the yoke-like member 56 in a similar manner to that described, and has a similar connection with the diaphragm 52, as will be obvious from Fig. 3. The screw-threaded rod-like member 61 and the rod-like member 58 are thus connected together to move as a unit, by means of the yoke-like member 56, and due to the fact that both the rod-like member 61 and the rod-like member 58 are fixed to the center of the diaphragms to which the same are connected, and are co-axial, the combined action of the two diaphragms will move the rod-like member 61 in a straight line lengthwise of itself. Due to the fact that the eccentrics 21 and 22 are mounted 180 degrees apart on the shaft 19, the diaphragm 32 will be flexed downwardly when the diaphragm 31 is flexed upwardly, and vice versa. When the diaphragm 31, for example, is flexed upwardly, the diaphragm 51 will be flexed outwardly, due to the increase in pressure in the chamber formed back of the diaphragm 51 in the recess 46, and when the diaphragm 31 is flexed downwardly, the diaphragm 51 will be moved inwardly due to the fact that the pressure in the chamber formed back of the diaphragm 51 will be decreased below atmospheric pressure, the atmospheric pressure acting on the outer face of the diaphragm 51. The diaphragm 52 will operate in a similar manner, and it will be obvious that when the diaphragm 52 is flexed to the right in Fig. 3, due to increase in pressure in the chamber back of the same, the diaphragm 51 will be flexed to the right, due to decrease in pressure in the chamber back of the same, and vice versa. Accordingly the pressure condition in the two chambers will operate in a cooperative manner to move the member 61 in a reciprocating movement lengthwise of itself.

Due to the fact that a certain amount of fluid friction exists in the relatively restricted passages 42 and 43, there will be a certain amount of lag in the change in pressure in the chambers back of the diaphragms 51 and 52 relative to the change in pressure in the chambers back of the diaphragms 31 and 32, due to the positive flexing of said diaphragms 31 and 32 by means of the eccentrics 21 and 22. Furthermore, due to the fact that the space sealed from the air within the member 28 is filled with air at atmospheric pressure before the mechanism is sealed, which constitutes an elastic or compressible fluid medium, a certain amount of compression of the fluid in any of the chambers would take place before any appreciable movement of the elastic diaphragm takes place, and also the reduction in pressure below atmospheric in the chamber in which such condition exists back of the diaphragm 51 or 52, as the case may be, will reach a certain amount before the atmospheric pressure will appreciably flex the diaphragm associated with such chamber in which a pressure below atmospheric exists.

Due to these facts, the sudden reversals in motion that take place in the reciprocating movement of the rods 26 and 27 are modified and cushioned when transmitted through the mechanism described, to the rod 61, thus preventing any backlash, or shock, due to sudden change in direction of movement of the parts, and producing a similar cushioned movement in the reciprocations of the member 62, which is to be reciprocated by means of the mechanism, said member 62 being shown in the drawings as being a tray-like member with a flange 63 thereon, with which the rod-like member is rigidly connected by means of the clamping nuts 64 engaging opposite faces of said flange 63, and screw-threadedly engaged with a screw-threaded end portion on the rod-like member 61. Said member 62 is shown as being mounted for a limited reciprocating movement in a manner commonly used for members that have a shaking movement, such as sifters, or bolters, by means of pairs of reeds, or elastic rod-like members, 65, which are clamped by means of suitable clamping means 66 to the member 62 and to a frame member 10'. The mounting for the member 62 and the particular configuration of the member 62 is merely illustrative. Any apparatus that is to be given a rapid reciprocating motion, of relatively small amplitude, can be operated by my improved means for producing a cushioned reciprocating movement.

Figure 5:
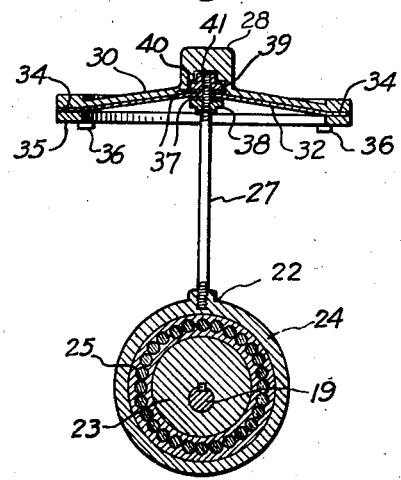
Fig. 5 is a section taken on the line 5—5 of Fig. 2, on a somewhat enlarged scale.

It will also be noted, that due to the fact that the eccentric 23 will move the sleeve-like member 24 both laterally and vertically, as viewed in Fig. 5, a connection between a rod-like member 26, or 27, and a member to be reciprocated, would cause a certain amount of whipping action in the rod-like member 26, or 27, which would be transmitted to the member that was to be shaken, or reciprocated, thereby, causing undesirable forces to be exerted thereon, producing a vibratory movement in a direction perpendicular to the direction of the reciprocation desired. In sorting, sifting, or grading apparatus having a shaking motion in substantially a plane, this vertical vibration, or whipping motion, causes the material that is being acted upon to be whipped up and down, preventing good sorting. This whipping action is entirely eliminated by my improved driving means, because the rod-like members 26 and 27 are connected with the flexible diaphragms 31 and 32, which will flex sufficiently to take care of this lateral movement of the lower ends of the members 26 and 27, due to the action of the eccentrics, and the movement resulting from the movement of the diaphragms 51 and 52 transmitted to the driving member 61 will be a movement that will be entirely free of any such whipping motion, being a true straight line reciprocating movement in the direction of length of the driving member 61, thus removing any undesirable vertical vibration from a screen or other member reciprocated thereby and producing a smooth back and forth motion, producing the desired shaking motion, in substantially a plane, of the stock moving thereover.

Figure 6:
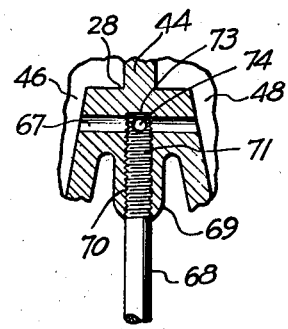
Fig. 6 is a fragmentary section, on an enlarged scale, showing the by-pass and valve controlling the by-pass passage.

The body portion 28 is provided with a passage 67 and valve 68, said passage 67 being shown in Fig. 3, and more clearly in Fig. 6, connecting the recesses 46 and 48 in the body portion 28, and thus connecting the chambers back of the diaphragms 51 and 52. An enlargement 69 is provided in the body portion 28, depending therefrom and having a screw-threaded opening 70 therein for receiving the screw-threaded end portion 71 of the valve member 68, said valve member 68 being merely a screw-threaded rod-like member having an end portion 72 extending substantially horizontally and screw-threaded into the screw-threaded opening 70, so as to make a substantially air tight connection with the opening in the enlargement 69, and having its inner end portion seated in a recess 73 in the body portion 28 between the two chambers 46 and 48. Said member 73 is provided with a transverse opening 74 that is adapted to be aligned with the passage 67, the valve being shown in Fig. 6 as being in a position such that the passage 67 between the two chambers thus formed in the body portion is closed, but it being obvious that the handle 72 can be turned to any angular position desired, to get any desired amount of opening of the passage 67.

It will be obvious that the greater the opening through the passage 67 is, the more the effect of the movement of the diaphragms 31 and 32 on the movement of the member 61 will be modified, as this passage connects a chamber in which there would be a pressure below atmospheric, with a chamber in which there would be a pressure above atmospheric. Thus the tendency will be for the fluid, such as the air within these chambers, to flow through the passage 67 from the chamber in which the higher pressure exists toward the chamber in which the lower pressure exists, thus decreasing the amount that the diaphragms 51 and 52 will be flexed, due to the pressures existing in the chambers back of the same.

It has been found that with the mechanism above described, the amplitude of the vibration, or reciprocating motion, can be adjusted very finely. The amplitude of the reciprocating motion will also vary in accordance with the speed at which the shaft is rotated. A variation in amplitude of the vibrating, or reciprocating movement, of the member 62 between ⅜ inch and ¼ inch has been obtained by rotating the shaft at the higher speed, and a variation in the amplitude of the reciprocating movement of between ½ inch and ¾ inch has been obtained at the lower speed, depending, of course, on the position of the valve 68.

What I claim is:

1. The combination with a member mounted for reciprocating movement and a rotatable shaft, of means for producing a rapid reciprocating movement of said member by rotation of said shaft, comprising a pair of eccentrics mounted 180 degrees apart on said shaft, a member reciprocated by each of said eccentrics, a diaphragm connected with each of said last mentioned members, a pair of chambers sealed from the atmosphere an external wall of each of which is formed by one of said diaphragms, a second pair of chambers sealed from the atmosphere each connected with one of said first mentioned chambers by a passage sealed from the atmosphere, a pair of diaphragms, each forming an external wall of one of said second mentioned chambers, said chambers and passages forming a sealed system, a compressible fluid in said chambers, a driving member connected with both said last mentioned diaphragms to reciprocate lengthwise of itself, means for varying the effective pressure changes produced in said second chambers during a cycle of movements of said diaphragm walls of said first chambers to adjust the amplitude of the reciprocating movement of said driving member produced by said mechanism, and means for connecting said driving member with said member mounted for reciprocating movement.

2. The combination with a member mounted for reciprocating movement and a rotatable shaft, of means for producing a rapid reciprocating movement of said member by rotation of said shaft, comprising a pair of eccentrics mounted 180 degrees apart on said shaft, a member reciprocated by each of said eccentrics, a diaphragm connected with each of said last mentioned members, a pair of chambers sealed from the atmosphere a wall of each of which is formed by one of said diaphragms, a second pair of chambers sealed from the atmosphere each connected with one of said first mentioned chambers by a passage, a pair of diaphragms, each forming a wall of one of said second mentioned chambers, an adjustable by-pass connection between said second mentioned chambers, a compressible fluid in said chambers, a driving member connected with both said last mentioned diaphragms to reciprocate lengthwise of itself, and means for connecting said driving member with said member mounted for reciprocating movement.

3. An apparatus of the character described, comprising a shaft, means for rotating said shaft, a pair of eccentrics mounted 180 degrees apart on said shaft, a member reciprocated by each of said eccentrics, a diaphragm connected with each of said last mentioned members, a pair of chambers sealed from the atmosphere an external wall of each of which is formed by one of said diaphragms, a second pair of chambers sealed from the atmosphere each connected with one of said first mentioned chambers by a passage sealed from the atmosphere, a pair of diaphragms, each forming a wall of one of said second mentioned chambers, one face of each of said last mentioned diaphragms being exposed to atmospheric pressure, said chambers and passages forming a sealed system, a compressible fluid in said chambers and passages, a driving member connected with both said last mentioned diaphragms to reciprocate lengthwise of itself, means for varying the effective pressure changes produced in said second chambers during a cycle of movements of said diaphragm walls of said first chambers to adjust the amplitude of the reciprocating movement of said driving member produced by said mechanism, and means for connecting said driving member with a member mounted for reciprocation.

4. An apparatus of the character described, comprising a shaft, means for rotating said shaft, a pair of eccentrics mounted 180 degrees apart on said shaft, a member reciprocated by each of said eccentrics, a diaphragm connected with each of said last mentioned members, a pair of chambers sealed from the atmosphere a wall of each of which is formed by one of said diaphragms, a second pair of chambers sealed from the atmosphere each connected with one of said first mentioned chambers by a passage, a pair of diaphragms, each forming a wall of one of said second mentioned chambers, one face of each of said last mentioned diaphragms being exposed to atmospheric pressure, a by-pass between said second mentioned chambers, an adjustable valve controlling flow of fluid through said by-pass, a compressible fluid in said chambers, a driving member connected with both said last mentioned diaphragms to reciprocate lengthwise of itself, and means for connecting said driving member with a member mounted for reciprocation.

5. The combination with a shaft, means for rotating the same and a member to be reciprocated, of a pair of aligned, oppositely disposed chambers, a compressible fluid therein, reciprocable means driven by said shaft to simultaneously decrease the fluid pressure in one of said chambers below that of the atmosphere and increase that in the other of said chambers above that of the atmosphere, said reciprocable means having a constant stroke, an adjustable member for simultaneously varying the changes in pressure in both said chambers produced by the strokes of said reciprocable means responsive to rotation of said shaft, diaphragms mounted to flex responsive to the difference in pressure between the atmosphere and that of the fluid in said chambers, and a driving member connected with both of said diaphragms to reciprocate lengthwise of itself and with the member to be reciprocated.

6. The combination with a shaft, means for rotating the same and a member to be reciprocated, of a member having a pair of oppositely directed aligned recesses therein, seats around the peripheries of said recesses, flexible diaphragms mounted on said seats to provide a pair of chambers sealed from the atmosphere having a compressible fluid therein, means driven by said shaft to simultaneously decrease the fluid pressure in one of said chambers below that of the atmosphere and increase that in the other of said chambers above that of the atmosphere, a yoke-like driving member connected centrally with both of said diaphragms on opposite sides of said member having said recesses, said connections between said driving member and said diaphragms being in alignment with each other and means connecting said driving member with said member to be reciprocated.

7. An apparatus of the character described comprising a body portion having a pair of recesses therein at opposite ends thereof opening in the same direction, seats surrounding said recesses, flexible diaphragms mounted on said seats to provide a pair of chambers sealed from the atmosphere, a shaft, means for rotating said shaft, means connecting said diaphragms and shaft to flex said diaphragms in opposite directions during rotation of said shaft, said body portion having a pair of oppositely directed aligned recesses therein, seats surrounding said last mentioned recesses, flexible diaphragms mounted on said last mentioned seats to provide a second pair of chambers sealed from the atmosphere, all said chambers having a compressible fluid therein, said body portion having passages therein each connecting one of said first mentioned chambers with one of said second mentioned chambers, and a driving member connected centrally with both said last mentioned diaphragms, said connections between said diaphragms and driving member being in alignment with each other, on opposite sides of said body portion to produce a straight line movement of said driving member.

WILLIAM E. NORVELL.